United States Patent
Artall et al.

(10) Patent No.: US 8,473,348 B2
(45) Date of Patent: Jun. 25, 2013

(54) PAID MEDIA ONLINE COOPERATIVE METHOD

(76) Inventors: Mark G. Artall, Lafayette, LA (US); Christopher Skinner, New Orleans, LA (US)

( * ) Notice: Subject to any disclaimer, the term of this patent is extended or adjusted under 35 U.S.C. 154(b) by 352 days.

(21) Appl. No.: 12/883,953

(22) Filed: Sep. 16, 2010

(65) Prior Publication Data

US 2012/0072292 A1    Mar. 22, 2012

(51) Int. Cl.
*G06Q 30/00* (2012.01)

(52) U.S. Cl.
USPC ............. 705/14.47; 705/14.4; 705/14.51; 705/14.72; 705/14.73; 705/14.42

(58) Field of Classification Search
CPC ........... G06Q 30/0241; G06Q 30/0248; G06Q 30/0243; G06Q 30/0253; G06Q 30/0273; G06Q 30/02777
USPC ............ 705/14.4, 14.42, 14.47, 14.51, 14.72, 705/14.73
See application file for complete search history.

(56) References Cited

U.S. PATENT DOCUMENTS

| | | | |
|---|---|---|---|
| 6,604,089 B1 | 8/2003 | Van Horn et al. | |
| 6,631,356 B1 | 10/2003 | Van Horn et al. | |
| 6,934,690 B1 | 8/2005 | Van Horn et al. | |
| 7,080,029 B1 | 7/2006 | Fallside et al. | |
| 7,103,565 B1 | 9/2006 | Vaid | |
| 7,107,230 B1 | 9/2006 | Halbert et al. | |
| 7,194,427 B1 | 3/2007 | Van Horn et al. | |
| 7,263,498 B1 | 8/2007 | Van Horn et al. | |
| 2002/0103746 A1 | 8/2002 | Moffett, Jr. | |
| 2007/0198355 A1 | 8/2007 | Samson et al. | |
| 2007/0288330 A1 | 12/2007 | Vaid | |
| 2008/0004955 A1* | 1/2008 | Mathew et al. | 705/14 |
| 2009/0094120 A1* | 4/2009 | Mangers et al. | 705/14 |
| 2011/0078000 A1* | 3/2011 | Ma et al. | 705/10 |

* cited by examiner

*Primary Examiner* — Raquel Alvarez
(74) *Attorney, Agent, or Firm* — Richard C. Litman

(57) ABSTRACT

The paid media online cooperative method is a multi-user method having computer-automated steps that provide price negotiation more effectively than a single buyer of media alone can. The digital cooperative includes organizations associated with the co-op, the organizations retaining the same variables as they would normally have outside of the co-op. The co-op method allows users to manage cost in the form of cost per visitor or per impression, thereby reducing advertising cost while upholding impression and visitor counts among all members. Software applications of the method may be centralized or distributed. The method provides a democratically controlled enterprise that is autonomous and independent of any of its members, and based on a lowest cost pricing model. Member participation in the co-op is voluntary. Each member accesses data fields to manage media buys, except the pricing field is unavailable to the member, and is instead managed by the software application.

8 Claims, 4 Drawing Sheets

| Editing keywords (xx) [Save] [Cancel] | | | | | | | | | | | | | |
|---|---|---|---|---|---|---|---|---|---|---|---|---|---|
| ☐ | Keyword | Ad Group | Status ⓘ | Max. CPC | Clicks | Impr. | CTR ⓘ | Avg. CPC ⓘ | Cost | Avg. POS. | Conv. (1-per-click) ⓘ | Cost / conv. (1-per-click) ⓘ | Conv. rate (1-per-click) ⓘ | View through Conv. ⓘ |
| | Total - all keywords | | | | 11 | 954 | 1.15% | $1.64 | $18.03 | 1.8 | 0 | $0.00 | 0.00% | 0 |
| ○ | "draw 3d car" | Car Types car | ☐ Eligible | $0.80 | 0 | 2 | 0.00% | $0.00 | $0.00 | 2 | 0 | $0.00 | 0.00% | 0 |
| ○ | "3d car interior" | Car Types car | ☐ Eligible | $2.25 | 0 | 3 | 0.00% | $0.00 | $0.00 | 2 | 0 | $0.00 | 0.00% | 0 |
| | ["3d carburetor"] [Phase match ▽] | Miscellaneous Car Components carburetor | ☐ Eligible | $ 0.55 | 0 | 1 | 0.00% | $0.00 | $0.00 | 2 | 0 | $0.00 | 0.00% | 0 |
| ○ | "3d racecar" | Racing Cars racecar | ☐ Eligible | $0.50 | 0 | 2 | 0.00% | $0.00 | $0.00 | 2 | 0 | $0.00 | 0.00% | 0 |
| [Enabled ▽] | ["3d speedometer"] [Phase match ▽] | Miscellaneous Car Components speedometer | ☐ Eligible | $ 0.31 | 0 | 1 | 0.00% | $0.00 | $0.00 | 2 | 0 | $0.00 | 0.00% | 0 |

*11a* — Keyword column; *11b* — metrics columns; *400* — table

FIG. 4

PAID MEDIA ONLINE COOPERATIVE METHOD

BACKGROUND OF THE INVENTION

1. Field of the Invention

The present invention relates to methods of advertising through a computer network, and particularly to a paid media online cooperative method for purchasing advertising on a search engine.

2. Description of the Related Art

AdWords is Google®'s (Google is a registered trademark of Google Inc. of Mountain View, Calif.) marketing tool that offers pay-per-click (PPC) advertising, and site-targeted advertising for both text and banner ads. The AdWords program includes local, national, and international distribution.

The advertising user creates ads and chooses keywords, which are words or phrases related to the advertising user's business. Along with the keyword specification, the advertiser specifies the maximum amount he/she is willing to pay per click, referred to as the maximum CPC. Ad placement will be determined by the maximum CPC, along with a variety of other parameters used by the search engine. When a search is done on Google using one of the advertiser's chosen keywords, the advertiser's advertisement may appear in the vicinity of the search results. Thus, the advertising targets an audience that is predisposed towards the advertiser's product or service.

The ordering of the paid-for listings depends on other advertisers' bids (PPC) and the "quality score" of all ads shown for a given search. The quality score is calculated by historical click-through rates (CTR), relevance of an advertiser's ad text and keywords, an advertiser's account history, and other relevance factors, as determined by Google. The quality score is also used by Google to set the minimum bids for an advertiser's keywords. The minimum bid takes into consideration the quality of the landing page as well, which includes the relevancy and originality of content, navigability, and transparency into the nature of the business. It is generally understood that the parameters used can change dynamically and do not always lead to a price or relevancy factor predicted by an advertising user within Google's keyword auctioning framework. It is believed by many that within Google's auctioning framework, participants do not necessarily fare best when they truthfully reveal any private information asked for by the auction mechanism, such as the value the user assigns to a keyword, in the form of a "truthful" bid.

Within Google's site-targeted advertising application, an advertiser may use an AdWords control panel to enter keywords, domain names, topics, demographic targeting preferences, and the like. Google then places the ads on what Google determines to be relevant sites within its content network. If domain names are targeted, Google also provides a list of related sites for placement. Advertisers may bid on a cost-per-impression (CPI) or cost-per-click (CPC) basis for site targeting.

With placement targeting, it is possible for an ad to take up the entire ad block, rather than have the ad block split into two to four ads, resulting in higher visibility for the advertiser.

While Google has established a minimum cost-per-thousand impressions bid for placement targeted campaigns, the minimum CPC bid is generally believed to be a nominal 0.01.

Google automatically determines the subject of pages and displays relevant ads based on the advertisers' keyword lists. To help clients with the complexity of building and managing AdWords accounts, search engine marketing agencies and consultants offer account management as a business service. This has allowed organizations without advertising expertise to reach a global, online audience. Users may also find assistance in a Google Adwords Keyword Tool, which provides a list of related keywords for a specific website or keyword. Within Google Adwords, the primary key performance indicator (KPI) is cost-per-click (CPC). Advertisers generally seek an advertising campaign that is low in cost and also effective in delivering traffic to their sites. Therefore, it would be desirable to remove CPC as a key performance indicator, which would have the effect of driving advertising costs down among cooperating advertisers.

Thus, a paid media online cooperative method solving the aforementioned problems is desired.

SUMMARY OF THE INVENTION

The paid media online cooperative method is a multi-user method having computer-automated steps that provide price negotiation more effectively than a single buyer of advertising media alone can provide. The digital cooperative is comprised of organizations associated with the co-op, the organizations retaining the same variables they would normally have outside of the co-op.

The co-op method steps manage cost in the form of cost-per-visitor or per impression, thereby reducing advertising cost while upholding impression and visitor counts among all members. The method uses software applications that may be centralized or distributed.

The method steps provide a democratically controlled enterprise that is autonomous and independent of any of its members, and based on a lowest cost pricing model. Participation by members in the co-op is voluntary. Each member accesses data fields to manage media buys, except the pricing field is unavailable to the member, and is instead managed by the software application.

These and other features of the present invention will become readily apparent upon further review of the following specification and drawings.

BRIEF DESCRIPTION OF THE DRAWINGS

FIG. 4 is a screenshot showing non-cost related, user-modifiable fields and cost related, fields not modifiable by the user in a paid media online cooperative method according to the present invention.

Similar reference characters denote corresponding features consistently throughout the attached drawings.

DETAILED DESCRIPTION OF THE PREFERRED EMBODIMENTS

Figure 1:
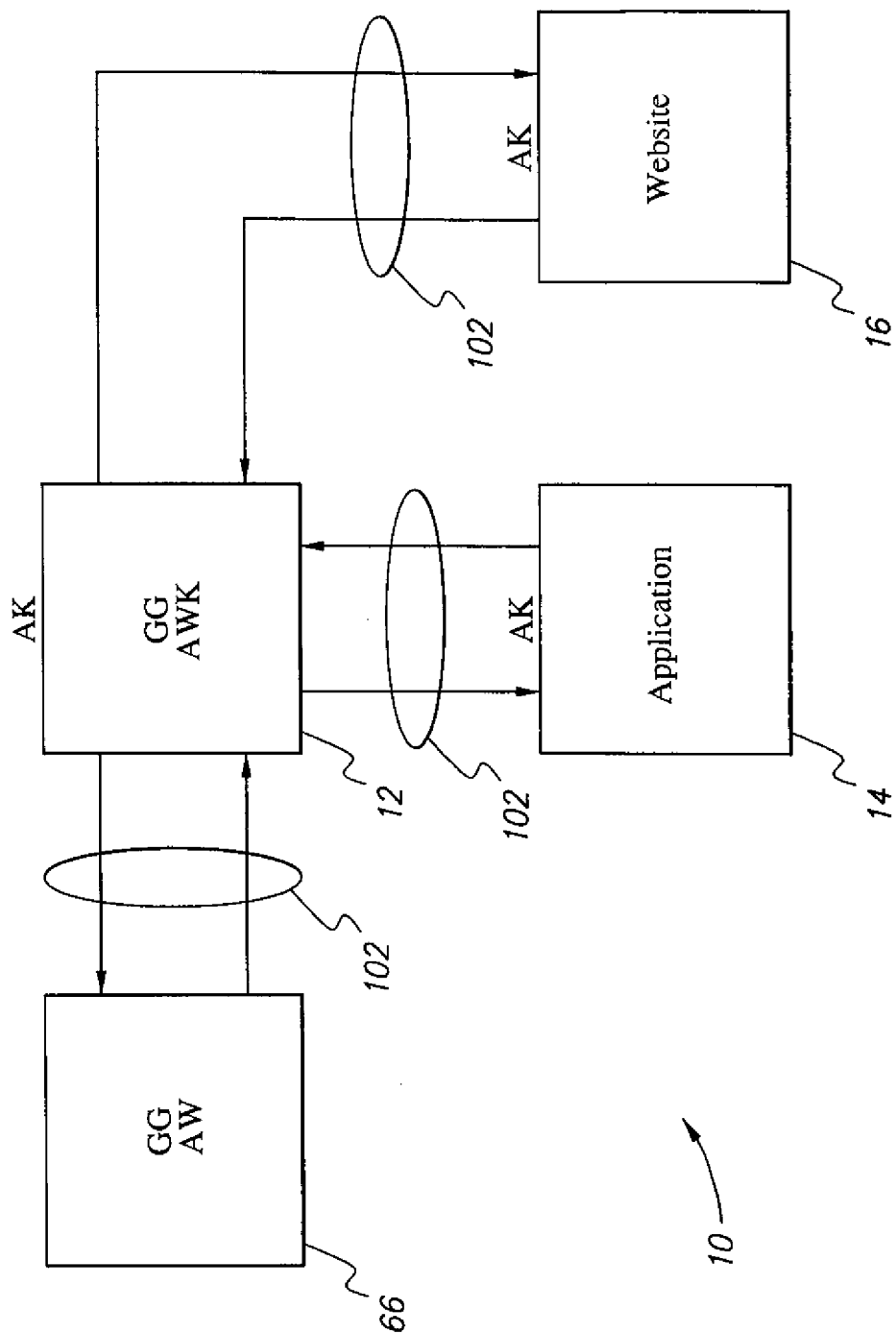
FIG. 1 is a block diagram showing the architecture supporting a paid media online cooperative according to the present invention.

As shown in FIG. 1 et seq., the paid media online cooperative method is implemented by an online media buying cooperative system 10 that includes an ad-coop server 12 in operable communication with an ad-coop application 14 and provides an ad-coop website 16. System components may communicate with one another via a network 102, which can be the Internet, or any other broadband, high traffic supporting network. It should be understood that the cooperative method may be an application or it may be web-based. The system 10 exchanges aggregated information from a plurality of member users with the exemplary media management platform 66 to provide highly competitive pricing of member user-desired advertising words and phrases.

Figure 2:
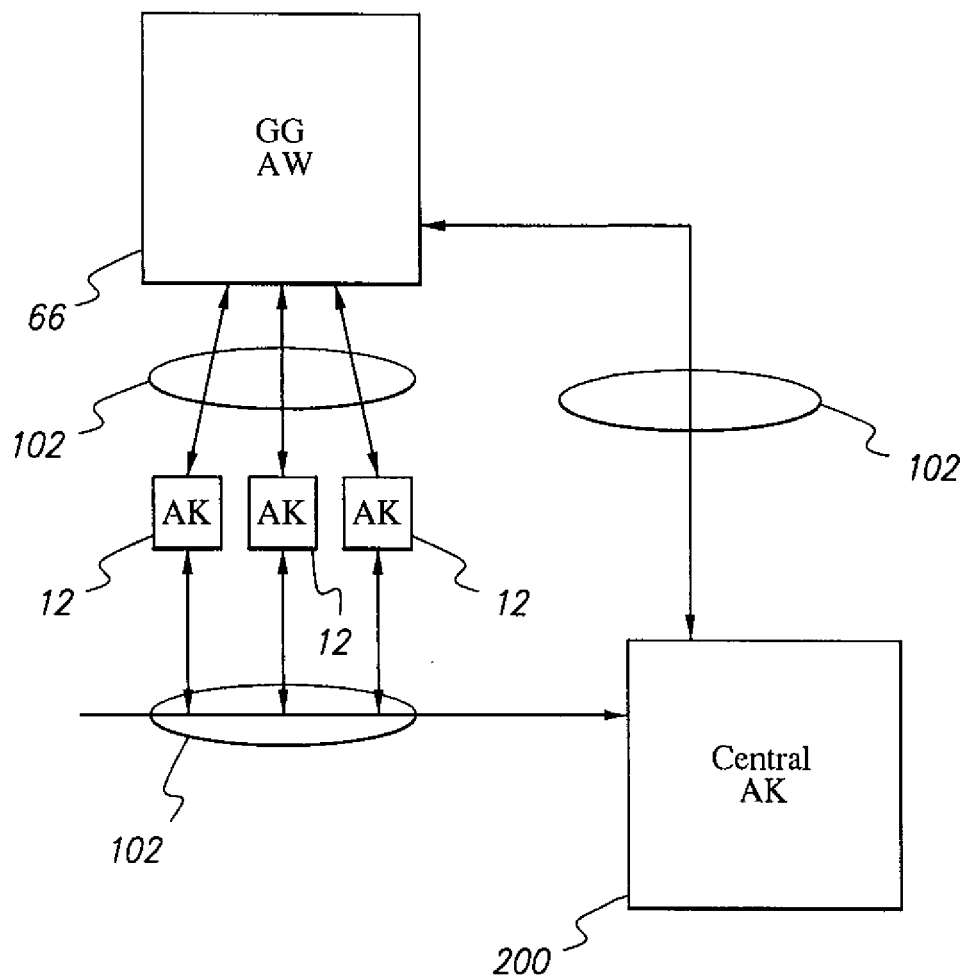
FIG. 2 is a block diagram showing multiple applications running in a paid media online cooperative method according to the present invention.

The application server 12 is the platform allowing the online media buying cooperative software application 14 to execute functions that negotiate price on behalf of a cooperative of member buyers, more effectively than a single buyer of media could negotiate via direct interface with the exemplary media management platform 66. As shown in FIG. 2, it is contemplated that a plurality of AK software applications 12 can communicate with the exemplary media management platform service 66, the communication of AK applications 12 with the exemplary media management platform 66 being managed and coordinated by a central AK server 200. The central AK server 200 records and utilizes a plurality of IP addresses assigned to disparate exemplary media management platform customers bidding for the same keywords and phrases during an established session with the exemplary media management platform system 66.

Figure 3:
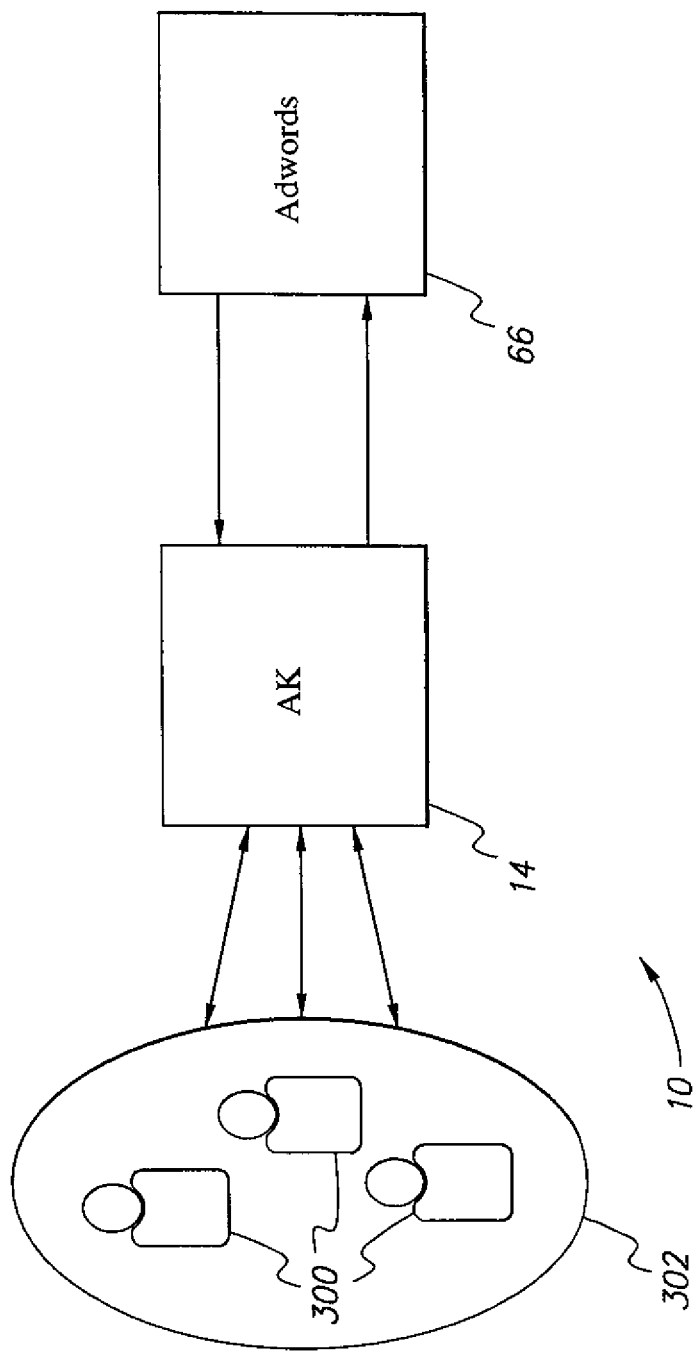
FIG. 3 is a block diagram showing multiple users accessing a system implementing a paid media online cooperative method according to the present invention.

As shown in FIG. 3, the digital cooperative 302 is comprised of organizations 300, which may be individual users, or groups of individual users. The co-op 302 communicates with the AK application 14, which allows the organizations 300 to retain the same variables as they would normally have outside of the co-op 302. However, the co-op tools of the application 14 allow users to manage cost in the form of cost per visitor or cost per impression, not cost per click. The cooperative method 10 utilizes algorithms to drive CPC down asymptotically towards a minimum value.

The goals of the co-op 302 include reducing advertising cost while upholding impression and visitor counts among all members 300. A major goal of the co-op 302 is to maintain sales or response values received from online media. Additionally, the co-op 302 has a major cooperative goal of producing an economic benefit to its members 300. The business objectives, i.e., the aforementioned goals of the co-op 302, are encoded in the application 14.

All co-op data is managed within the application 14, which may be central or distributed. Widgets, i.e., controls, are presented to a user's browser, and may be utilized to implement required data operations requiring user interaction with the system 10. Wrapper technology may be used to transform the fields presented by the search engine 66 into corresponding fields presented by the application 14.

The co-op 302 is a democratically controlled enterprise that is autonomous and independent of any of its members 300. Participation by members 300 in the co-op 302 is voluntary. Adverse pricing effects caused by non-participation, i.e., defection of any of members 300, are mitigated via custom algorithms running within the application 14. Each member accesses data fields to manage media buys, except the pricing field is unavailable to the member, and is instead managed by the software application. Ranking is based on the user accessible parameters, but it should be understood that ranking is not based on price. Factors that determine ranking include search engine factors, such as "quality score" or other factors internal to the search engine, click through rate (CTR), quality of advertisement, and the like. The primary key performance indicator (KPI) is click through rate (CTR). CTR can be modified by changes to a Title, description, URL, and Google KPIs, including Page Rank. These factors, and changes to CTR, allow Google to position an advertiser by factors beyond "Max bid CPC". The maximum bid amount an advertiser is willing to pay does not always outrank a competitor, i.e., a high page rank or a recently changed rank may bump up a lower paying advertiser to a higher position than the maximum bidder's position.

If all advertisers bid $0.01, or whatever is the lowest allowed bid as set by the search engine 66, then clearly other non-CPC-related factors control the ranking of the advertisers. According to the method, the remaining KPIs are a set of parameters that are transparent to the advertiser, and fair, in that they preserve a competitive auction environment. The system methodology 10 encourages use as 'collective engagement' by more than one advertiser, thereby allowing for CPC savings. The application 14, in conjunction with the website 16, provides a browser agent that interfaces with the search engine 66, thereby preventing the search engine 66 from excluding participants in the cooperative method 10. A first plurality of Internet Protocol Addresses (IPs) is provided to correspond in a one-to-one manner with a second plurality of cooperative members for data communication with the search engine 66 so that the search engine 66 will accept the cooperative members.

The system methodology, which incorporates the co-op 302, is specifically focused on AdWords or other online marketing cost per click search engines. For example, referring to FIG. 4, an exemplary web page 400 is provided in which the data fields 11a can be managed by each member for control over his/her media buys in the same way as AdWords, but the pricing fields 11b, typically known as "cost per visitor" and "cost per click", are managed solely by the application, and therefore not user manageable. It should be understood that the web page 400 is merely exemplary, and that the method may present a plurality of similar web pages having a wide variety of user-manageable parameters, such as parameters 11a, which may be mixed in with non-user manageable cost parameters, such as parameters 11b. The cooperative system 10 provides web pages for the management of advertising campaigns in a manner similar to Google's AdWords system and may utilize ad management functions and methods, such as those described in U.S. Pat. No. 7,734,503, issued on Jun. 8, 2010, which is incorporated by reference in its entirety herein.

Since the cost fields are managed by the co-op application 14, they cannot be modified by the member. The member joins the co-op 302 for the benefit of economic savings, while controlling all other fields 11a. Any variable field provided by the search engine 66 is also provided by the co-op website 16. See Table 1, below, for a listing of modifiable fields that the application 14 can present in a plurality of web pages in a similar manner as field presentation by the search engine 66.

TABLE I

Fields that can be modified

| KEYWORD | AD TEXT | CAMPAIGN SETTINGS | AD GROUP CREATION | AD PLACEMENT |
|---|---|---|---|---|
| Match Type | Text Field | Device Targeting | Edit Ad Group Status | Ad Placement Field |
| Text | Text Field Status | Geo-Targeting | | |
| Keyword | | Budget Limit | | |
| Negative Keyword Status | | Ad Scheduling Ad Rotation Languages Position Preference | | |

As shown in FIG. 4, the 11b fields are grayed out and not changeable by the user. These fields, however, are updated by the application, and such updates can be viewed by the user.

Tables 2 and 3 compare the resulting actual CPC between an AdWords type search engine 66 and the AdCoop (AK) method bid for a search term, e.g., "patent attorney". In the comparison it should be noted that there is no change in ranking when utilizing the method, and that the application 14, via network connection 102, adjusts the CPC downward at the search engine 66, thereby destroying the original auction model established by the search engine 66. The method 10 works because the bid CPC is made a lowest value and, by rules of the search engine 66, no more than max bid CPC will be charged.

TABLE 2

Exemplary search engine cost per click

| CLIENT | RANK | BID CPC | ACTUAL CPC |
|---|---|---|---|
| A | 1 | $50.00 | $30.00 |
| B | 2 | $50.00 | $31.50 |
| C | 3 | $30.00 | $35.00 |
| D | 4 | $5.50 | $5.00 |

TABLE 3

Exemplary co-op application cost per click

| CLIENT | RANK | BID CPC | ACTUAL CPC |
|---|---|---|---|
| A | 1 | $0.10 | $0.10 |
| B | 2 | $0.10 | $0.10 |
| C | 3 | $0.10 | $0.10 |
| D | 4 | $0.10 | $0.10 |

A new member joins the co-op with either an existing or new account. If the account is existing, all historical data is used to position the member at the same position and state prior to joining. If the account is new with no account history associated with a joining member, the position and state is placed in the same way as a non-member who would 'sign up' or open an account with an online marketing entity.

Changes to marketing are placed in real time. Any variable that can be changed by the user in real time can be changed in the co-op system 10. All variables are changed online using an Internet browser or downloadable application having access to the website 16 via the Internet 102.

Prior negotiation of price, e.g., cost per click, cost per impression, does not exist in search engines. No offer for a lower price exists in the current model, and price is removed from the method to prevent giving any advantage to a member or the search engine/medium. Price becomes a non-factor to the co-op because the system 10 reduces price to a value that approaches zero. No economic benefit to raising cost of media exists for the cooperative 302 or its members 300.

No economic advantage to member quantity exists. If three non-members are vying for visitors in a medium, cost is raised to market value by competition amongst its members. If any number of non-members exists, the cost per click or the cost per visitor tends to market value, based upon the medium (search engine, etc) and the willingness of the bidders (non-members) to raise prices (cost). In this system, the value of the goods or services sold is loosely connected to the total cost of marketing, shared by the collective bidders. For example, low value, low volume items sold online typically have low cost per click values. High value, low volume items sold typically have high cost per click. Moderate value and high volume items have 'industry average' cost per click values. In 2009, the average cost per click was about $0.55.

As shown in Tables 4 and 5, the method handles defecting members by downwardly adjusting their rank as seen by the search engine 66, thereby mitigating the effect that defecting members have on CPC's associated with the remainder of the coop members 300.

TABLE 4

CPC bids with defecting client C

| CLIENT | RANK | BID CPC | ACTUAL CPC |
|---|---|---|---|
| C | 1 | $1.00 | $0.10 ≦ x ≧ $1.00 |
| A | 2 | $0.10 | $0.10 |
| B | 3 | $0.10 | $0.10 |
| D | 4 | $0.10 | $0.10 |

TABLE 5

Search engine ranking with defecting client C

| CLIENT | RANK | BID CPC | ACTUAL CPC |
|---|---|---|---|
| A | 1 | $1.01 | $0.91 |
| B | 2 | $0.90 | $0.90 |
| D | 3 | $0.50 | $0.90 |
| C | 4 | $1.00 | $1.00 |

If an advertising user bypasses the AK application 14 or website and unilaterally readjusts his/her CPC within the search engine 66, the AK application 14 detects the occurrence and locks out the advertising user from using the AK application 14. Moreover, as shown in Table 5 above, the price for defection exacted by the cooperative method is an extreme lowering of rank, which ultimately causes search engine 66 to assign a lower weight to the defector's bid CPC. The cooperative method 10 then reduces over a moving average time period the non-defectors' (A, B, and D) Bid CPC's back to a minimum value. Once the max bid CPC is readjusted, ranking returns to a new order, less the defector. Based on CTR, quality score and other variables of the search engine 66, the cooperative method 10 proceeds to reestablish prior lowest bid CPC's.

The cooperative 302 can reduce the cost per click for the aforementioned scenarios to a low value. The cooperative 302 is programmed with the goal of reducing cost per click to $0.01, the lowest cost in a search engine. A lower cost per click or cost per impression can be realized for banner advertisements or link advertisements.

It is to be understood that the present invention is not limited to the embodiment described above, but encompasses any and all embodiments within the scope of the following claims.

We claim:

1. A computer software product, comprising a non-transitory medium readable by a processor, the non-transitory medium having stored thereon a set of instructions for implementing a paid media online cooperative method, the set of instructions including:
   (a) a first sequence of instructions which, when executed by the processor, causes the processor to establish a buying cooperative organization having the purpose of purchasing keywords used in advertising associated with search requests performed by a search engine, the organization having a plurality of member advertisers;

(b) a second sequence of instructions which, when executed by the processor, causes the processor to maintain the buying cooperative organization online, the buying cooperative organization being in operable communication with an online search engine;

(c) a third sequence of instructions which, when executed by the processor, causes the processor to accept ad campaign parameters from the at least one of the member advertisers, the ad campaign parameters being compatible with like parameters operable within the search engine, the ad campaign parameters accepted from the at least one member advertiser including keywords but excluding any keyword cost related parameters, wherein the keyword cost related parameters are set independent of input from the at least one member advertiser;

(d) a fourth sequence of instructions which, when executed by the processor, causes the processor to transmit the ad campaign parameters to the search engine;

(e) a fifth sequence of instructions which, when executed by the processor, causes the processor to transmit the keyword cost related parameters to the online search engine;

(f) a sixth sequence of instructions which, when executed by the processor, causes the processor to monitor execution of the ad campaign by the online search engine, the keyword cost related parameters being selected to minimize an aggregate cost of the keywords to the cooperative based upon monitored feedback;

(g) a seventh sequence of instructions which, when executed by the processor, causes the processor to change the rank of a defecting member advertiser to a lowest rank in the keyword cost related parameters transmitted to the online search engine when it is determined by the execution monitoring of the sixth sequence of instructions that the defecting member advertiser has personally adjusted the cost related parameters personally associated therewith outside of the buying cooperative organization; and (h) an eighth sequence of instructions which, when executed by the processor, causes the processor to reduce the cost related parameters associated with remaining ones of the member advertisers following cost related parameter adjustment caused by adjustment of the defecting member's cost related parameters.

2. The computer software product according to claim 1, wherein the third sequence of instructions (c) further comprises a sequence of instructions which, when executed by the processor, causes the processor to provide at least one webpage from which the at least one member advertiser can enter the ad campaign parameters.

3. The computer software product according to claim 1, wherein the cost related parameters include a cost per click.

4. The computer software product according to claim 1, further comprising a ninth sequence of instructions which, when executed by the processor, causes the processor to assign a plurality of IP addresses on a one-to-one correspondence with each of the at least one member advertiser bidding for the same keywords and phrases during communication with the search engine, thereby assuring that the search engine accepts the communication from the online buying cooperative.

5. A paid media online cooperative system, comprising:

(a) means for establishing a buying cooperative organization having the purpose of purchasing keywords used in advertising associated with search requests performed by a search engine, the organization having a plurality of member advertisers;

(b) means for maintaining the buying cooperative organization online, the buying cooperative organization being in operable communication with an online search engine;

(c) means for accepting ad campaign parameters from at least one of the member advertisers, the ad campaign parameters being compatible with like parameters operable within the search engine, the ad campaign parameters accepted from the at least one member advertiser user including keywords, but excluding any keyword cost related parameters;

(d) means for transmitting the ad campaign parameters to the search engine;

(e) means for automatically formulating the keyword cost related parameters;

(f) means for transmitting the keyword cost related parameters to the online search engine;

(g) means for monitoring execution of the ad campaign by the online search engine;

(h) means for adjusting the keyword cost-related parameters to minimize an aggregate cost of the keywords to the cooperative, the keyword cost-related parameter adjusting step being based on results from the execution monitoring step;

(i) means for changing the rank of a defecting member advertiser to a lowest rank in the keyword cost related parameters transmitted to the online search engine when it is determined by the execution monitoring that the defecting member advertiser has personally adjusted the cost related parameters personally associated therewith outside of the buying cooperative organization; and (j) means for reducing the cost related parameters associated with remaining ones of the member advertisers following cost related parameter adjustment caused by adjustment of the defecting member's cost related parameters.

6. The paid media online cooperative system according to claim 5, wherein the means for accepting ad campaign parameters from the at least one member advertiser further comprises means for providing at least one webpage from which the at least one member advertiser can enter the ad campaign parameters.

7. The paid media online cooperative system according to claim 5, wherein the means for automatically formulating the keyword cost-related parameters further comprises means for including a cost per click as one of the keyword cost related parameters.

8. The paid media online cooperative system according to claim 5, further comprising means for assigning a plurality of IP addresses on a one-to-one correspondence with each of the at least one member advertiser bidding for the same keywords and phrases during communication with the search engine, thereby assuring that the search engine accepts the communication from the online buying cooperative.

* * * * *